2,699,994

PHOTOGRAPHIC TREATING SOLUTIONS CONTAINING FERRICYANIDE IONS AND ALPHA ETHER CARBOXYLIC ACID COMPOUNDS

Jacob Quentin Umberger, Holmdel, N. J., assignor to E. I. du Pont de Nemours and Company, Wilmington, Del., a corporation of Delaware No Drawing. Application April 15, 1953,
Serial No. 349,089

12 Claims. (Cl. 95—88)

This invention relates to inorganic toning compositions. More particularly it relates to inorganic toning baths and to processes of intensifying photographic images with such baths.

Various toning baths are known in the photographic art. Of these, iron-toning baths have enjoyed rather widespread use. They generally include ferric and ferricyanide ions and a sequestering and buffering agent. The latter agent is usually citric acid or oxalic acid. These conventional iron toners are somewhat unstable due in part to the oxidation of the citric or oxalic acid compound by ferric and/or ferricyanide ions. They have the further shortcoming of being very corrosive to metal surfaces. This is due primarily to the low pH (about 1 to 2) of the solution. When alkalies are added to raise the pH it has been found that the degree of intensification is reduced. Similarly, if chromates are added to reduce corrosion, the degree of intensification is reduced. This reduced intensification is due to oxidation of the silver image by the anti-corrosion agent.

An object of this invention is to provide improved photographic toning baths. Another object is to provide photographic iron-toning baths which are free from the above disadvantages. A more specific object is to provide iron-toning baths which have reduced corrosive properties and increased stability. Still further objects will be apparent from the following description of the invention.

The above objects are accomplished by the toning solutions of this invention which comprise an aqueous solution containing ferricyanide ions, cations that form relatively insoluble ferrocyanide compounds and an alpha ether carboxylic acid compound of the formula:

$$R(O-CH_2COOM)_n \qquad (I)$$

wherein M is hydrogen or other water-soluble, salt-forming cation, e. g., lithium, sodium, potassium, ammonium, substituted ammonium, e. g., tetramethyl- and tetraethylammonium or an amine, and R is a monovalent or polyvalent organic nucleus and $n$ is 1, 2 or a higher positive integer.

Suitable salt-forming amines include mono-, di- and tri-methyl, -ethyl and -propyl amine, ethanolamine, triethanolamine and cyclohexylamine.

A group of alpha ether carboxylic acid compounds which fall within the scope of general Formula I, and are useful in the toning solutions are diglycolic acid, $HOOC-CH_2-O-CH_2-COOH$, methoxyacetic acid, $HOOC-CH_2-O-CH_3$, o-methoxyphenoxyacetic acid,

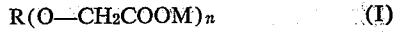

p-nitrophenoxyacetic acid,

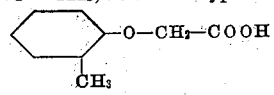

2,7-naphthoxydiacetic acid,

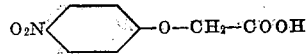

ethylene bisglycolic acid,
$HOOC-CH_2-O-CH_2-CH_2-O-CH_2-COOH$ starch glycolic acid, starch $(-O-CH_2-COOH)_n$ and cellulose glycolic acid or carboxymethyl cellulose, cellulose $(-OCH_2-COOH)_n$, where $n$ is a positive integer, and their salts with the salf-forming cations mentioned above.

The amount of the alpha-ether carboxylate compound present in the bath used for toning silver images will, of course, depend on the particular compound in question and to a lesser extent on the particular film to be treated and other constituents of the bath. Concentrated stock solutions are comprehended by the invention and they can be diluted prior to use. The solutions can be made by simply adding the various constituents to water in any order except in cases where the ingredients are added in a certain order to prevent precipitates, such as ferric hydroxide, from forming.

The invention will be further illustrated but is not limited by the following examples.

EXAMPLE I

The following toning bath is made by adding the constituents in the order named with stirring and after waiting for the previous constituent to be completely dissolved:

| | |
|---|---:|
| Water _____ ml__ | 700.0 |
| Diglycolic acid _____ gms__ | 30.0 |
| Sodium hydroxide _____ gms__ | 18.0 |
| Ferric nitrate·9H$_2$O _____ gms__ | 14.0 |
| Potassium bromide _____ gms__ | 2.0 |
| Potassium ferricyanide _____ gms__ | 5.0 |
| Water to make 1.0 liter. | |

This bath has a pH approximately 4.5 at 77° F. A silver image in a photographic film can be adequately toned in this bath in seven minutes at 77° F. The potassium bromide can be eliminated with similar results.

EXAMPLE II

The following toning bath is made after the manner described in Example I:

| | |
|---|---:|
| Water _____ ml__ | 700.0 |
| Diglycolic acid _____ gms__ | 60.0 |
| Sodium hydroxide _____ gms__ | 36.0 |
| Ferric nitrate·9H$_2$O _____ gms__ | 14.0 |
| Molybdic acid, 85% MoO$_3$ _____ gms__ | 1.0 |
| Potassium ferricyanide _____ gms__ | 5.0 |
| Water to make 1.0 liter. | |

This bath has a pH of approximately 5 and is especially useful for blue toning Roentgenograms or radiographs. The molybdic acid further reduces corrosion of metal surfaces without impairing the formation of the blue pigment. Similar useful toning baths can be made by substituting alkali metal salts of molybdic acid or tungstic acid or the latter acid for the molybdic acid of this example.

Similar results are obtained by adding 30 grams of potassium thiocyanate to the solution of Example II. It acts as a fixing agent for silver salts which otherwise would mar the clarity of the Roentgenogram by light-scattering action.

The following examples illustrate further processes of toning silver images with the toning baths of this invention.

EXAMPLE III

The front and rear film elements of the type described in Jennings U. S. Patent 2,462,503, Example 1, except that the yellow filter dye of Example 2 of Gaspar U. S. 2,274,782 was used instead of colloidal silver in the blue record emulsion, and the coating weights of silver halide were different, the blue record being 35 mg. per square dec., green record 85 mg. per square dec., and red record 87 mg. per square dec., were exposed while in emulsion-to-emulsion contact to a multicolor scene. Also boric acid was added to the two photosensitive emulsions of the front film to prevent premature stripping of the film during processing.

The red record negative was developed nine minutes at 68° F. to gamma 0.8 in developer prepared as follows:

Water _____ ml__ 750.0

| | |
|---|---|
| Mono-methyl para-aminophenol·H₂SO₄ gms | 1.0 |
| Hydroquinone gms | 2.0 |
| Sodium sulfite, anhydrous gms | 50.0 |
| Borax gms | 7.5 |
| Potassium bromide gms | 0.2 |

Water to make 1.0 liter.

The front film was developed in the same developer (pH approximately 8.8) for 14 minutes at 68° F., fixed in a hardening fixer mixed as follows:

| | |
|---|---|
| Water ml | 500.0 |
| Hypo gms | 300.0 |
| Sodium sulfite, anhydrous gms | 11.0 |
| Acetic acid, 28% ml | 45.0 |
| Potassium alum gms | 10.0 |

Water to make 1.0 liter,
Acetic acid, 28% to make pH 4.0, for 14 minutes at 68° F., washed 14 minutes and dried.

The rear film (red record) and the processed front film (green record—the low gamma blue record component being insignificant) were printed into the cyan and magenta color forming layers, respectively, of a multilayer color print film of the type described in the "Jour. Motion Picture and Television Eng.," November 1950, pp. 455–476. Then the processed front film was placed in a 2% aqueous solution of oxalic acid, which treatment permitted the easy removal of the outer, green record emulsion layer. The blue record emulsion layer remaining on the front film support was then toned by seven minutes treatment in the blue toning bath of Example I at 68° F., washed and dried.

The intensified blue record image was then exposed into the yellow color-forming layer of the aforementioned color print film, which was then processed to a color reproduction as described in the above reference. Good color rendition was obtained since the iron toner increased the gamma of the blue record image from 0.2 to 0.8 to the green printing light used to expose the yellow color-forming layer of said color print film.

EXAMPLE IV

A perforated photographic motion picture stripping film of the structure described in Jennings U. S. Patent 2,462,503 (column 6, lines 64 to 66) in which a gelatino-silver bromoiodide photosensitive emulsion was used to produce a silver halide coating weight of 35 mg. per square dec. for the green-blind red-sensitive layer which contained 1,1'-diethyl-2,4-carbocyanine iodide and boric acid, said layer being nearest the film support, and a silver halide coating weight of 75 mg. per square dec. was used for the outer orthochromatic gelatin-silver halide emulsion layer which contained 1,1'-diethyl-2,2'-cyanine iodide as the green-light sensitizing dye and the dye of Example 2 of Gaspar U. S. Patent 2,274,782 as a yellow filter dye and boric acid, which layer was coated on an intermediate sodium-o-sulfobenzaldehyde polyvinyl acetal stripping layer, was placed in a camera in emulsion-to-emulsion contact with a blue-record front film as disclosed in said Patent 2,462,503 and exposed to a multicolor scene, the entrant light first passing through a blue-record front film. The front film comprised a cellulose acetate film base which was coated with a gelatino silver bromoiodide emulsion to a coating weight of 17 mg. silver halide and 75 mg. gelatin per square dec. The films were removed from the camera and the front film was developed for about five minutes at 68° F. to gamma 0.18 with normal agitation in a negative developer made by admixing the following components:

| | |
|---|---|
| Water cc | 975.0 |
| Mono-methyl para-aminophenol·H₂SO₄ gms | 0.8 |
| Sodium sulfite, anhydrous gms | 90.0 |
| Hydroquinone gms | 1.0 |
| Borax gms | 3.0 |
| Potassium bromide gms | 0.1 |

Water to make 1.0 liter.

This solution had pH 8.9 at 68° F. Following fixing, washing, and drying, the low gamma silver image was intensified by 7 minutes treatment in the toning solution of Example I.

The rear multilayer film was processed as follows: (a) developed for 14 minutes at 68° F. with normal agitation in the foregoing developer whereby the outer layer was developed to gamma 0.8 and the inner to gamma 0.31, (b) fixed for a period of 14 minutes in a hardening fixer made by admixing the following components:

| | |
|---|---|
| Water cc | 500.0 |
| Hypo gms | 300.0 |
| Sodium sulfite, anhydrous gms | 11.0 |
| Acetic acid, 28% cc | 45.0 |
| Potassium alum gms | 10.0 |

Water to make 1.0 liter, (c) the fixed film was washed for a period of five minutes in cold running water and dried. The outer emulsion layer exhibited good adherence to the inner layer due in part to the inclusion of boric acid in the emulsions prior to coating. Then the rear film was soaked for 30 seconds in the following emulsion-transfer solution at 78° F.:

| | |
|---|---|
| Water cc | 750.0 |
| Sodium tetralin sulfonate gms | 62.5 |
| Sodium dodecyl sulfate gms | 31.3 |
| Oxalic acid, dihydrate gms | 20.0 |

Water to make 1.0 liter, and the wet outer emulsion layer was then pressed into intimate contact with a second similarly perforated gelatin blank film comprising a transparent cellulose acetate film base coated with a gelatin layer to a weight of about 75 mg. per square dec. The outer layer was then stripped from the remaining red-record, and the blank film with its adherent image record was washed and dried. The red-record negative silver image remaining on the original rear film base was intensified to gamma 0.8 by first bleaching it in an aqueous potassium ferricyanide solution containing potassium bromide and then developing it to such a gamma in a color developing solution containing N-diethyl p-aminoaniline hydrochloride, a phenol, sodium carbonate, potassium bromide and a small amount of sodium sulfite. A cyan colored dye image was formed in situ with the developed silver image. The gamma was 0.8 to the red light used to print this color component negative into the print film below.

The three separate film elements containing the color-separation silver image records were then separately printed into the appropriate layers of a multilayer color print film of the type described in the "Journal Motion Picture and Television Engineers," November 1950, pages 455–476. This multilayer film was composed of a cellulose acetate base having a removable antihalation backing on one side and yellow, cyan and magenta color-forming polyvinyl acetal polymer-silver halide emulsion layers coated in that order on the other side of the base. A yellow filter material (e. g., Tartrazine C. I. No. 640) was present in the magenta color former emulsion layer. The exposed multilayer color film was then color-developed at 68° F. in a solution made by admixing the following components:

| | Grams |
|---|---|
| N-diethyl p-aminoaniline hydrochloride | 2.5 |
| Sodium sulfite, anhydrous | 10.0 |
| Potassium bromide | 2.0 |
| Sodium carbonate, monohydrate | 47.0 |

Water to make 1.0 liter, for ten minutes and processed to a color print as described on pp. 469–471 of the above reference.

EXAMPLE V

A high-speed X-ray film bearing a gelatino silver bromoiodide (96:4 molar ratio) emulsion layer having a coating weight of 103 mg. of silver halide per square dec. coated on each side of a waterproofed cellulose acetate film base 0.008 inch thick was intercalated between intensifying screens and exposed to a human head for 1/30 second by X-rays from a conventional medical X-ray apparatus. The exposed Roentgenogram was then developed for five minutes at 68° F. in a fast-acting metol-hydroquinone developer, rinsed ten seconds in water, fixed ten minutes at 68° F. in a conventional hardening fixer, washed 20 minutes and dried.

This Roentgenogram appeared greatly under-exposed when compared with a normal exposure of 1/10 second. However, when the under-exposed film was toned for five minutes in the following solution at 68° F., the exposure appeared normal. When viewed through a red filter which transmit substantially all of the visible wavelengths greater than 600 millimicrons (such as the Wratten No. 25 filter), the contrast of the image was greatly enhanced and tissue relatively non-opaque to X-rays, such as the human ear, was clearly discernible. Through a blue filter the contrast was lower and permitted observation of the relatively opaque bone tissue.

*Toning bath*

| | | |
|---|---|---|
| Water | ml | 500.0 |
| Diglycolic acid | gms | 60.0 |
| Sodium hydroxide | gms | 36.0 |
| Ferric nitrate·9H$_2$O | gms | 14.0 |
| Molybdic acid, 85% MoO$_3$ | gms | 1.0 |
| Potassium ferricyanide | gms | 5.0 |
| Potassium bromide | gms | 2.0 |

Water to make 1.0 liter.

This solution had pH 4.95 at 68° F.

EXAMPLE VI

The front film of Example IV was exposed, developed for ten minutes at 70° F., fixed, washed, and dried as in said example except that the following color-coupling developer was substituted for the conventional black-and-white developer:

| | | |
|---|---|---|
| Water | ml | 500.0 |
| N-diethyl p-aminoaniline hydrochloride | gms | 3.5 |
| p-Methylaminophenol, sulfuric acid salt | gms | 0.1 |
| Sodium sulfite | gms | 5.0 |
| Sodium carbonate·H$_2$O | gms | 45.0 |
| Potassium bromide | gms | 2.2 |
| 4,4′-o-sulfo-benzylidene-bis- (1-o-nitrophenyl-3-methyl-5-pyrazolone) | gms | 5.0 |

Water to make 1.0 liter.

The pH was adjusted to 11.5 with 1 molar NaOH (approximately 6.5 ml.). The film containing the magenta dye image was then toned for approximately seven minutes at 25° C. in an iron toner mixed as follows:

| | | |
|---|---|---|
| Water | ml | 700.0 |
| Ferric nitrate·9H$_2$O | gms | 3.5 |
| Diglycolic acid | gms | 16.0 |
| Potassium bromide | gms | 6.0 |
| Potassium ferricyanide | gms | 1.0 |

Water to make 1.0 liter.

Sufficient 3 molar NaOH was then added to make pH 4.0 at 25° C. Following washing and drying, the diffuse optical density of the film strip was determined to green light of dominant wavelength about 550 millimicrons. An area of optical density 0.35 due to elementary silver was increased to over 3.0 by the deposition of magenta dye and iron blue pigment.

EXAMPLE VII

Strips of the front film described in Example IV were developed in an ordinary negative developer of the type described in that example, they were then fixed, washed and dried as in that example. These strips were toned, respectively, for a period of five minutes at 68° F. in the following toner solutions having added thereto, respectively, diglycolic acid, methoxyacetic acid, o-methoxyphenoxyacetic acid, p-nitrophenoxyacetic acid, 2,7-naphthoxydiacetic acid and ethylene bis glycolic acid as the alpha-ether carboxylic acid, starch glycolic acid and carboxy methyl cellulose:

| | |
|---|---|
| Water | 400.0 ml. |
| Alpha-ether carboxylic acid | 0.224 to .448 moles. |
| 10 molar sodium hydroxide solution to make pH 5.15 at 25° C. | |
| Ferric nitrate·9H$_2$O (in 50 ml. H$_2$O) | 14.0 gms. |
| Potassium ferricyanide (in 50 ml. H$_2$O) | 5.0 gms. |

Water to make 0.95 liter.
Adjust to pH 4.6 at 25° C. using 10% nitric acid or 10% aqueous borax.

Water to make 1.0 liter.

When precipitation occurred upon adding the ferric nitrate, the α-ether carboxylic acid was added in the higher concentration indicated. Each of the toning baths produced characteristic blue-toned images. In the case of ethylene bis glycolic acid the blue image was slightly more transparent than when the diglycolic acid toner was used. The toning bath containing methoxyacetic acid produced a blue image of exceptional clarity and transparency especially in areas of high density.

EXAMPLE VIII

A Roentgenogram was exposed and processed as in Example V and iron-toned in a solution prepared as follows:

| | Grams |
|---|---|
| Potassium ferricyanide | 1.0 |
| Ferric nitrate·9H$_2$O | 3.5 |
| Diglycolic acid | 50.0 |
| Sodium chloride | 6.0 |
| Sodium hydroxide | 27.6 |

Water to make 1.0 liter.
pH=4.4 at 77° F.

The solution intensified some of the silver fog of the Roentgenogram. When sodium hydroxide was added to raise the pH to 4.8, fog intensification was greatly decreased. Similarly, on addition of 1 to 2 grams of KF·2H$_2$O (potassium fluoride hydrate), the fog intensification was decreased. Addition of more diglycolic acid and sodium hydroxide similarly decreased fog intensification.

EXAMPLE IX

An under-exposed Roentgenogram made from a film of the type described in Example V was treated for a period of eight minutes at room temperature in the following toning bath which had pH 5.0±0.1 at room temperature:

| | Grams |
|---|---|
| Diglycolic acid | 60.0 |
| Sodium hydroxide | 36.0 |
| Ferric nitrate·9H$_2$O | 14.0 |
| Potassium ferricyanide | 5.0 |
| Sodium nitrite | 1.0 |
| Potassium fluoride | 1.0 |
| Wool Orange (Rowes Colour Index No. 27) | 0.09 |

Water to make 1.09 liter.

The sodium nitrite of Example X decreased corrosion more strongly than did the molybdic acid in other examples. Other water-soluble nitrites, e. g., potassium nitrite, lithium nitrite and ammonium nitrite can be used in like manner. The orange dye stained the film, reduced the overall blueness of the image, and improved the visual contrast of the image.

The alpha-ether carboxylic acid compounds which are described above are not limited in their use to the specific toning solutions or baths described above but can be used in any inorganic toner containing ferricyanide ion as the oxidizing agent. The baths, for example, may contain lead, nickel, mercury, copper, tin, uranyl, vanadyl, etc., ions in addition to the ferricyanide ion.

In place of the ferric nitrate of the toners in the examples one can substitute other equivalent inorganic iron compounds, e. g., ferric chloride, ferric bromide, ferric fluoride, ferric sulfate, etc. Mixtures of two or more of the ferric salts can be used.

The invention, moreover, is not limited to potassium ferricyanide as the ferricyanide salt. Suitable additional salts include lithium, sodium and ammonium ferricyanide. Mixtures of two or more soluble ferricyanides can be used.

Various bases or alkalies other than sodium hydroxide can be used to raise or adjust the pH of the toning solutions. Among such compounds are potassium hydroxide, sodium bicarbonate, borax, sodium acetate, amines, e. g., dimethyl amine, diethyl amine, n-propyl, n-butyl and n-pentyl amine, cyclohexyl amine, piperidine, etc. The amount by weight of such bases or alkalies in the toning baths can be greater than prior art toning baths without impairing the intensification of the silver image. Thus, sufficient alkaline compound to raise the pH to 4 to 6 may be used with good results because of the presence of the compound of formula R(O—CH$_2$COOM)$_n$.

The relatively high pH iron-toners of this invention constitute media of relatively low oxidation or electron accepting potential. Hence, it is possible to add silver halide solvents such as thiocyanate salts to these iron-toners. This results in a combination fixer and iron-toner of usable stability.

Diglycolate ions in aqueous iron-toner solutions manage to prevent precipitation of insoluble iron salts but still permit the formation of blue pigment in films containing a silver image. In the preferred pH range of the iron-toners, i. e., pH 3 to 6, sequestering agents such as citrates and ethylene diamine tetraacetate apparently sequester the ferric ions so well as to appreciably weaken the blue pigment density in toned films. The latter sequestering agents as well as others, e. g., potassium fluoride, nitrilo triacetic acid and methylamino diacetic acid, can be used in combination with diglycolate ions or any of the compounds of Example VII.

The invention is particularly useful in increasing the speed and contrast of Roentgenograms and radiographs. For example, the contrast of iron-toned images may be conveniently varied by use of differently colored filters for viewing as in X-ray use or photographic printing in general. When viewed through a red filter, the contrast of iron-toned Roentgenograms is very high—permitting the diagnosis of tissue normally not clearly outlined due to low opacity to X-radiation. Through a blue filter the contrast is low but the latitude is high. Thus, by use of appropriate filters one can diagnose tissue both of low opacity to X-radiation (yellow, orange or red filter) and of high opacity to X-radiation (blue or no filter).

In some of the existing X-ray film products a blue tint is incorporated in the film to improve its viewing characteristics. The necessity for such tinting is removed if the iron-toner is adjusted so as to produce overall blue tint through intensification of fog. Gelatin hardeners, such as potassium alum, are advantageously added to the toning solutions of this invention.

The invention also is useful in increasing the intensification of under-exposed or under-developed negatives or positives where a blue-toned image is desired. Blue-toned negatives can be made to exhibit variable contrast to a panchromatic print medium depending on the spectral quality of the light transmitted by the printing filter.

The toning baths of the invention can be used to increase contrast to red light by as much as 15 times. This makes them useful in preparing travelling silhouette mattes or masks for combining foreground and background scenes of different origin. In the Williams process for silhouette formation, unlighted black velvet is used as a backdrop and usually appears lighter in the negative than any part of the illuminated foreground. A high contrast print can be made and by repeated operations the contrast built up until the background is clear and the foreground completely black or vice versa. This silhouette constitutes the travelling matte. For example, one can take a black and white motion picture negative film, expose it, develop it to gamma 0.75 in a conventional metol-hydroquinone cine negative developer, and then iron-tone it with the toning bath of Example I for seven minutes at 68° F. When read on an electronic photometer (densitometer) employing electromagnetic radiation of wavelength 700 millimicrons, two exposure regions which differ by only 0.03 in silver density can be intensified to a density difference of 0.50. This helps one to distinguish between the unlighted black velvet background and any dark object in the foreground and thus facilitates the preparation of a silhouette especially when red light is used to print the iron-toned negative into a red-sensitive, high contrast film or other printing medium.

The high degree of intensification obtainable by the iron-toning baths and processes of this invention makes possible the use of very low silver halide coating weights in the front film of bipacks or tripacks or in the blue record emulsion layer of stripping films. This is conducive to high speed and resolution in the layers behind or beneath the front film or blue record emulsion, respectively.

The invention obviously is not limited to the toning of the stripping films described in Jennings U. S. Patent 2,462,503 which have stripping layers composed of water-soluble acetals of vinyl alcohol polymers. To the contrary, the stripping layers may be composed of other polymeric materials including the polymeric aminonitrogen-containing materials described in Marasco U. S. Patent 2,182,814, "Jour. Society Motion Picture and Television Engineers," April 1950, pp. 445–446, and the polyvinyl-pyridine quaternary salts described in Richards U. S. Patent 2,487,829 and Umberger U. S. application Ser. No. 115,943, filed September 15, 1949, now Patent No. 2,612,446.

An advantage of the invention resides in the fact that the compounds of the formula $R(O—CH_2COOM)_n$ are resistant to oxidation (viz., loss of electrons) and enable one to prepare toning baths of high degree of intensification at pH range 4 to 6.

Diglycolic acid, the preferred acid, falling within Formula I, has the advantage that it is cheap, non-volatile, and highly soluble in water. It sequesters $Fe^{+++}$, but not so strongly as to prevent formation of blue pigment by the action of an iron toner on a silver image. At pH approximately 4.5 the acid exists half as the doubly-charged anion and half as the singly-charged anion. Thus, diglycolic acid is a good buffer in the pH range 3 to 6, the preferred pH range for our improved iron toners.

A still further advantage of the invention is that with these comparatively high pH iron toners it is possible to blue tone a color-coupler developed silver image without destroying or removing the color-coupled dye image in the film. The acid iron toners of the prior art destroy such dye images.

By raising the pH and the sequestering agent concentration, one is able to control and reduce the intensification of development fog. This is very useful for X-ray film intensification. Also, in the case of treating a beaded sound track, one can use the iron-toning baths in which the fog is reduced to a low level.

As many widely different embodiments of this invention can be made without departing from the spirit and scope thereof, it is to be understood that the invention is not to be limited except as defined by the claims.

What is claimed is:

1. A composition comprising an aqueous solution containing ferricyanide ions, cations that form relatively insoluble ferrocyanide compounds and an alpha ether of a carboxylic acid compound containing at least one radical of the formula —O—$CH_2COOM$, wherein M is a member taken from the group consisting of hydrogen and water-soluble salt-forming cations, taken from the group consisting of diglycolic acid, methoxyacetic acid, o-methoxyphenoxyacetic acid, p-nitrophenoxyacetic acid, 2,7-naphthoxydiacetic acid, ethylene bisglycolic acid, starch glycolic acid and cellulose glycolic acid and their water-soluble salts.

2. A composition comprising an aqueous solution containing ferricyanide ions, cations that form relatively insoluble ferrocyanide compounds and an alpha ether of a carboxylic acid compound containing at least one radical of the formula —O—$CH_2COOM$, wherein M is a member taken from the group consisting of hydrogen and water-soluble salt-forming cations, taken from the group consisting of diglycolic acid, methoxyacetic acid, o-methoxyphenoxyacetic acid, p-nitrophenoxyacetic acid, 2,7-naphthoxydiacetic acid, ethylene bisglycolic acid, starch glycolic acid and cellulose glycolic acid and their water-soluble salts, a water-soluble nitrite and a water-soluble thiocyanate.

3. A composition comprising an aqueous solution containing ferricyanide ions, cations that forms relatively insoluble ferrocyanide compounds and diglycolic acid.

4. A composition comprising an aqueous solution containing ferric nitrate, sodium hydroxide, potassium ferricyanide and diglycolic acid.

5. A composition comprising an aqueous solution containing ferric nitrate, sodium hydroxide, potassium ferricyanide, molybdic acid and diglycolic acid.

6. An aqueous photographic toning solution containing ferricyanide ions, cations that form relatively insoluble ferrocyanide compounds and diglycolic acid anions in an amount of 10 to 200 grams per liter of solution.

7. The process which comprises treating a photographic element containing a silver image in an aqueous solution containing ferricyanide ions, cations that form relatively insoluble ferrocyanide compounds and an alpha ether of a carboxylic acid compound containing at least one radical of the formula —O—$CH_2COOM$, wherein M is a member taken from the group consisting of hydrogen and water-soluble salt-forming cations, taken from the group consisting of diglycolic acid, methoxyacetic acid, o-methoxyphenoxyacetic acid, p-nitrophenoxyacetic acid, 2,7-naphthoxydiacetic acid, ethylene bisglycolic acid, starch glycolic acid and cellulose glycolic acid and their water-soluble salts.

8. A process as set forth in claim 7 wherein a dye of a color which is approximately complementary to that of said insoluble ferrocyanide compound is present in said solution.

9. The process which comprises treating a photographic element containing a silver image in an aqueous solution containing ferricyanide ions, cations that form relatively insoluble ferrocyanide compounds and diglycolic acid.

10. The process which comprises treating a photographic element containing a silver image in an aqueous solution containing ferric nitrate, an alkali, potassium ferricyanide and diglycolic acid.

11. The process which comprises treating a photographic element containing a silver image in an aqueous solution containing ferric nitrate, sodium hydroxide, potassium ferricyanide and diglycolic acid.

12. The process which comprises treating a photographic element containing a silver image in an aqueous solution containing ferric nitrate, sodium hydroxide, potassium ferricyanide, sodium nitrite and diglycolic acid.

References Cited in the file of this patent

UNITED STATES PATENTS

| | | |
|---|---|---|
| 2,625,475 | Russell et al. | Jan. 13, 1953 |
| 2,625,476 | Henn | Jan. 13, 1953 |